US012640566B2

(12) United States Patent
Ehara et al.

(10) Patent No.: US 12,640,566 B2
(45) Date of Patent: May 26, 2026

(54) VEHICLE CONFIGURED TO PARTICIPATE IN DEMAND RESPONSE USED FOR ADJUSTING A POWER SUPPLY AND DEMAND BALANCE IN A POWER SYSTEM

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 774 days.

(21) Appl. No.: 18/159,424

(22) Filed: Jan. 25, 2023

(65) Prior Publication Data

US 2023/0246448 A1 Aug. 3, 2023

(30) Foreign Application Priority Data

Feb. 3, 2022 (JP) ................................. 2022-015661

(51) Int. Cl.
*B60L 53/63* (2019.01)
*B60L 53/12* (2019.01)
(Continued)

(52) U.S. Cl.
CPC .............. *H02J 3/322* (2020.01); *B60L 53/12* (2019.02); *B60L 53/63* (2019.02); *B60L 55/00* (2019.02); *H02J 50/10* (2016.02); *H02J 2105/37* (2026.01)

(58) Field of Classification Search
CPC ...... B60L 53/12; B60L 53/122; B60L 53/124; B60L 53/126
(Continued)

(56) References Cited

U.S. PATENT DOCUMENTS 9,469,209 B2 * 10/2016 Ichikawa .............. B60L 53/122
10,320,923 B2 * 6/2019 Moghe .................... H04L 67/52
(Continued)

FOREIGN PATENT DOCUMENTS

JP 2015-095983 A 5/2015
WO WO-2022015017 A1 * 1/2022 .............. B60L 53/66

OTHER PUBLICATIONS

Translation of WO2022015017, 27 pages.*

*Primary Examiner* — Nathaniel R Pelton
(74) *Attorney, Agent, or Firm* — Finnegan, Henderson, Farabow, Garrett and Dunner, LLP

(57) ABSTRACT

A vehicle is configured to participate in demand response used for adjusting a power supply and demand balance in a power system. The vehicle includes a power accumulation device, a power transfer device that enables power transfer in one of a first, a second, and a third method, and a control device that controls the power transfer device. The first method enables power to be transferred through a power cable between the power accumulation device and an outside of the vehicle. The second method enables power to be transferred in a non-contact manner while the vehicle is stopped. The third method enables power to be transferred in the non-contact manner while the vehicle is traveling. When the vehicle participates in the demand response, the control device selects a method in a preferential order of the first, the second, and the third method and execute the power transfer.

5 Claims, 5 Drawing Sheets

(51) Int. Cl.

| | |
|---|---|
| *B60L 55/00* | (2019.01) |
| *H02J 3/32* | (2006.01) |
| *H02J 50/10* | (2016.01) |
| *H02J 105/37* | (2026.01) |

(58) Field of Classification Search

USPC ......................................................... 320/109

See application file for complete search history.

(56) References Cited

U.S. PATENT DOCUMENTS

| | | | |
|---|---|---|---|
| 10,369,893 B2 * | 8/2019 | Moghe ................. | G05D 1/0212 |
| 12,229,693 B2 * | 2/2025 | Maeda .................... | B60L 53/67 |
| 12,253,873 B2 * | 3/2025 | Worth .................... | G06Q 10/04 |
| 2011/0175569 A1 * | 7/2011 | Austin ................. | B60L 53/126 |
| | | | 320/109 |
| 2012/0043807 A1 * | 2/2012 | Ichikawa ............. | B60L 53/126 |
| | | | 307/9.1 |
| 2019/0006878 A1 * | 1/2019 | Misawa ............. | H02J 7/00034 |
| 2021/0237716 A1 * | 8/2021 | Prasad .................. | H04N 23/90 |
| 2023/0226937 A1 * | 7/2023 | Hanson .................. | B60L 53/36 |
| | | | 30/108 |
| 2024/0383357 A1 * | 11/2024 | Hashimoto ............. | B60L 53/32 |

* cited by examiner

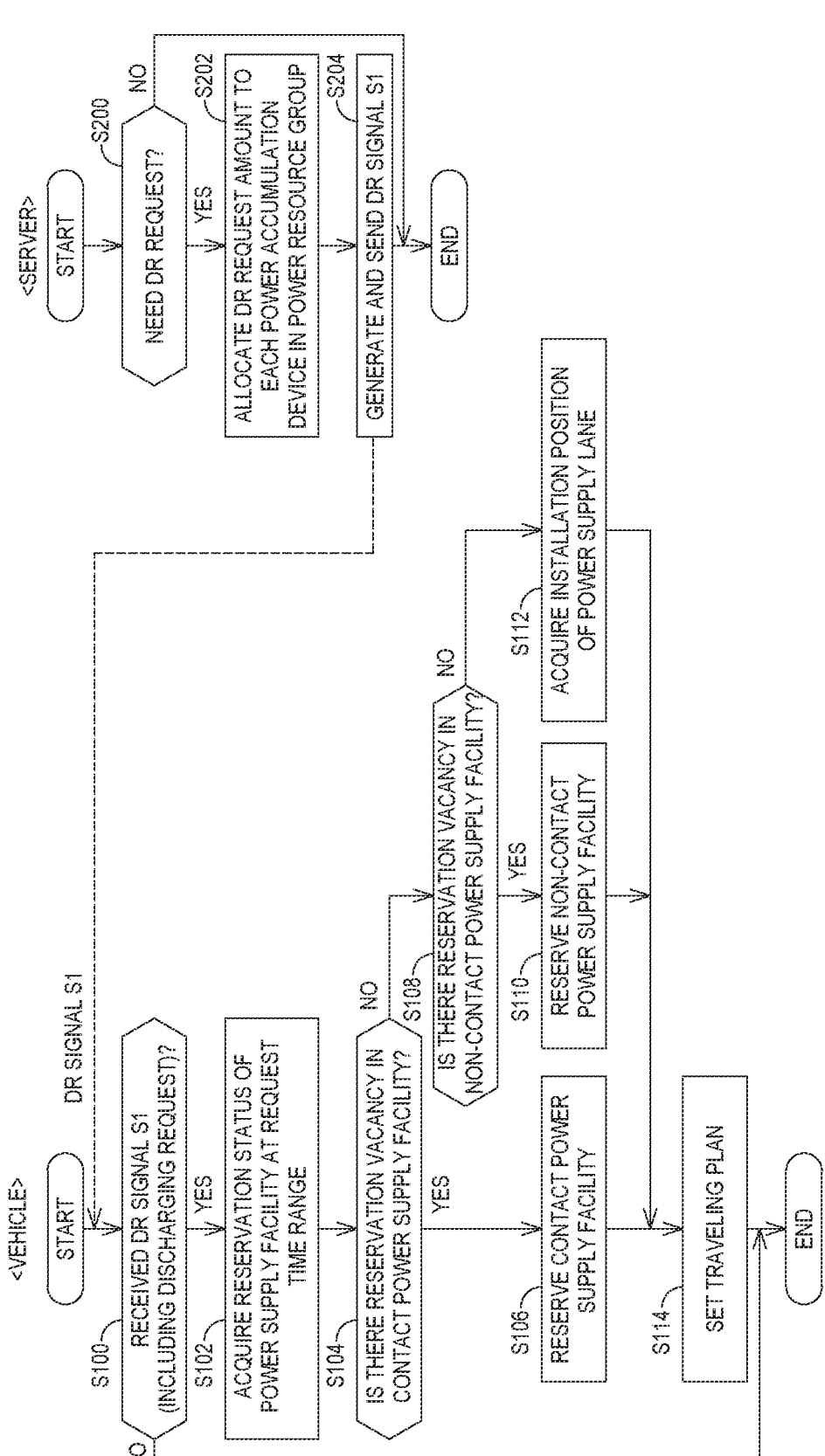

<SERVER>

START

S200 — NEED DR REQUEST?

YES

S202 — ALLOCATE DR REQUEST AMOUNT TO EACH POWER ACCUMULATION DEVICE IN POWER RESOURCE GROUP

S204 — GENERATE AND SEND DR SIGNAL S1

NO

END

DR SIGNAL S1

<VEHICLE>

START

S100 — RECEIVED DR SIGNAL S1 (INCLUDING DISCHARGING REQUEST)?

YES

S102 — ACQUIRE RESERVATION STATUS OF POWER SUPPLY FACILITY AT REQUEST TIME RANGE

S104 — IS THERE RESERVATION VACANCY IN CONTACT POWER SUPPLY FACILITY?

YES

NO

S108 — IS THERE RESERVATION VACANCY IN NON-CONTACT POWER SUPPLY FACILITY?

YES

NO

S106 — RESERVE CONTACT POWER SUPPLY FACILITY

S110 — RESERVE NON-CONTACT POWER SUPPLY FACILITY

S112 — ACQUIRE INSTALLATION POSITION OF POWER SUPPLY LANE

S114 — SET TRAVELING PLAN

NO

END

VEHICLE CONFIGURED TO PARTICIPATE IN DEMAND RESPONSE USED FOR ADJUSTING A POWER SUPPLY AND DEMAND BALANCE IN A POWER SYSTEM

CROSS-REFERENCE TO RELATED APPLICATION

This application claims priority to Japanese Patent Application No. 2022-015661 filed on Feb. 3, 2022, incorporated herein by reference in its entirety.

BACKGROUND

1. Technical Field

The present disclosure relates to a vehicle.

2. Description of Related Art

A virtual power plant (hereinafter, referred to as a VPP) which remotely and integratedly controls, using a server or the like, small-scale energy resources, such as power accumulation devices mounted on electrified vehicles parked in factories or at homes, such that they function as if they were a single power plant is present. In such a VPP, for example, by charging and discharging the power accumulation devices mounted on the electrified vehicles and changing a power demand amount in a power network, it is possible to level power demand.

The electrified vehicles are connected to the power network such that, for example, the in-vehicle power accumulation devices can be charged and discharged via power equipment provided outside the electrified vehicles.

As such an electrified vehicle, for example, Japanese Unexamined Patent Application Publication No. 2015-95983 discloses a battery electric vehicle capable of transferring power (contact power transfer) using power equipment connected to a commercial power source through a power cable, and a battery electric vehicle capable of transferring power (non-contact power transfer) with power equipment in a non-contact manner. Further, when executing the non-contact power transfer, the vehicle can execute the non-contact power transfer not only while the vehicle is stopped but also while the vehicle is traveling.

SUMMARY

In the above-described VPP, a server which is an aggregator, executes demand response (DR) in order to adjust a power supply and demand balance. Specifically, the server adjusts the power supply and demand balance in the power network by requesting a plurality of vehicles to participate in the DR and sending instructions for transferring power to the vehicles responding to the request. When a vehicle capable of both the contact power transfer and the non-contact power transfer participates in the DR, it is necessary to select an appropriate method of power transfer in consideration of, for example, a traveling plan that includes a vacancy status of a power transfer facility or a route on which the non-contact power transfer is possible while traveling on a traveling route to a destination.

The present disclosure provides a vehicle participating in an adjustment of a power supply and demand balance and capable of selecting an appropriate method of power transfer.

A vehicle according to an aspect of the present disclosure is configured to participate in demand response used for adjusting a power supply and demand balance in a power system. The vehicle includes a power accumulation device, a power transfer device that enables power transfer in one of a first method, a second method, and a third method, and a control device configured to control the power transfer device. The first method is a method that enables power to be transferred through a power cable between the power accumulation device and an outside of the vehicle. The second method is a method that enables power to be transferred in a non-contact manner between the power accumulation device and the outside of the vehicle while the vehicle is stopped. The third method is a method that enables power to be transferred in the non-contact manner between the power accumulation device and the outside of the vehicle while the vehicle is traveling. When the vehicle participates in the demand response, the control device is configured to select a method in a preferential order of the first method, the second method, and the third method and execute the power transfer.

As such, by preferentially selecting the power transfer of the first method having a relatively high efficiency in response to a request for the demand response, it is possible to maximize a compensation obtained by responding to the request for the demand response. Further, even when the power transfer of the first method cannot be executed, by preferentially selecting the second method over the third method having a relatively low efficiency, it is possible to increase the compensation obtained by responding to the request for the demand response by a larger amount than when selecting the third method. Further, even when none of the first method or the second method can be executed, by selecting the third method and responding to the request for the demand response, it is possible to avoid being penalized for not participating in the demand response.

In the above aspect, the vehicle may further include an acquisition device configured to acquire a reservation status of a facility that corresponds to a request area of the demand response and a request time range of the demand response. The facility may be able to execute the power transfer with the vehicle while being parked. The control device may preferentially select a facility that is able to execute the first method over the second method when a facility is reserved in the request area in the request time range using the acquired reservation status.

As such, by reserving a facility in advance, it is possible to reliably participate in the demand response by the selected method.

In the above aspect, the control device may select a method that is enabled to be executed in the preferential order of the first method, the second method, and the third method in response to a request for the demand response immediately before a start time.

As such, by preferentially selecting a method having a high efficiency in response to an urgent demand response, it is possible to maximize the compensation obtained by responding to the request for the demand response.

In the above aspect, the vehicle may be configured not to participate in the demand response when a loss amount caused by a penalty that is set for not participating in the demand response is smaller than a loss amount caused by selecting one of the first method, the second method, and the third method.

As such, when the loss amount is caused by participating in the demand response is large, it is possible to restrict an increase in the loss amount caused by not participating in the request for the demand response.

In the above aspect, the vehicle may further include a photovoltaic power generation device. The control device may be configured to preferentially select at least one of the second method and the third method over the first method when a request time range of the demand response includes a period where an amount of power generated by the photovoltaic power generation device is higher than a threshold value.

As such, for example, it is possible to increase the number of demand response participation frames for vehicles that can execute the power transfer by only the first method in the facility that enables power to be supplied by the first method and the second method.

With the aspect of the present disclosure, it is possible to provide a vehicle participating in an adjustment of a power supply and demand balance and capable of selecting an appropriate method for power transfer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a configuration of a vehicle;

FIG. 4 is a flowchart illustrating an example of processing executed in each of an ECU and a server.

DETAILED DESCRIPTION OF EMBODIMENTS

Figure 1:
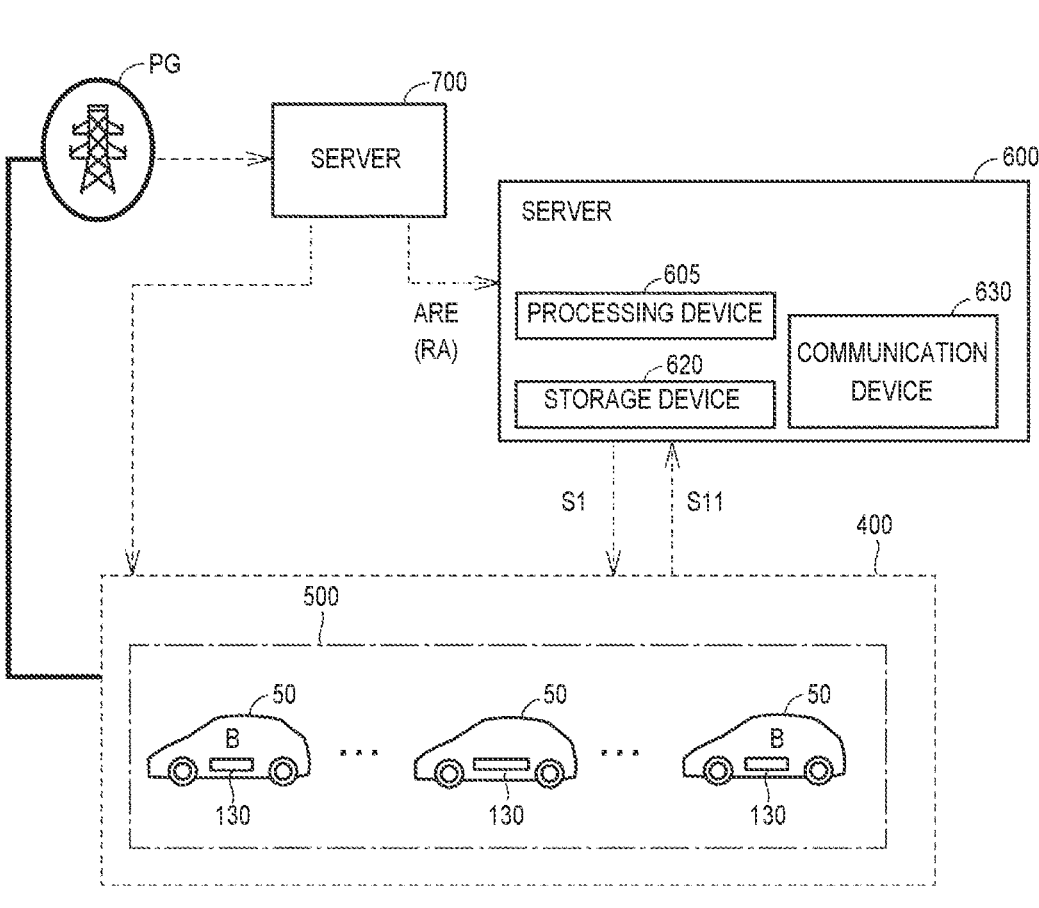
FIG. 1 is a diagram illustrating a schematic configuration of a power management system including vehicles according to the present embodiment.

Hereinbelow, embodiments of the present disclosure will be described in detail with reference to the drawings. In the drawings, the same or corresponding parts are denoted by the same reference signs, and description thereof will not be repeated.

FIG. 1 is a diagram illustrating a schematic configuration of a power management system 10 including vehicles according to the present embodiment. With reference to FIG. 1, the power management system 10 includes a power system PG, a power resource group 400, a server 600, and a server 700.

The power system PG is composed of power transmission and distribution equipment. The power system PG is maintained and managed by a power company, which is an operator thereof.

The power resource group 400 includes a vehicle group 500. The vehicle group 500 includes a plurality of vehicles 50 each having a battery 130 mounted thereon. Each vehicle 50 is configured to be electrically connectable to the power system PG, and is a battery electric vehicle (BEV) that functions as a distributed power source. The power resource group 400 may include other power systems, such as a home energy management system (HEMS). When a power resource is requested to participate in the DR by an aggregator (described below), a user (an owner) of each power resource of the power resource group 400 concludes a contract with the aggregator in advance so it can participate in the DR.

Each vehicle 50 is configured to enable power transfer with power equipment provided outside the vehicle. The power transfer is executed by, for example, external charging in which the vehicle 50 charges its battery 130 using power from the power equipment, or external power supply in which the vehicle 50 supplies power accumulated in its battery 130 to the power equipment.

When each vehicle 50 executes the external charging, power supply from the power system PG to each vehicle 50 is required, and thus a power demand amount in the power system PG is increased. On the other hand, when each vehicle 50 executes the external power supply, power can be supplied from each vehicle 50 to the power system PG, and thus the power demand amount in the power system PG is decreased. For this reason, each vehicle 50 can participate in the adjustment of the power demand amount in the power system PG by executing the power transfer, such as the external charging or the external power supply. Hereinbelow, such adjustment of the power demand amount may be referred to as demand response (DR).

When the vehicle 50 participates in "upper DR" for increasing the power demand amount in the power system PG, the power demand amount can be increased by increasing the number of vehicles that execute the external charging, decreasing the number of vehicles that execute the external power supply, increasing a charging amount in the vehicle 50 that executes the external charging, or decreasing a power supply amount in the vehicle 50 that executes the external power supply. The upper DR is executed when, for example, the power amount that can be supplied is larger than the power demand amount in the power system PG.

Alternatively, when the vehicle 50 participates in "lower DR" for decreasing the power demand amount in the power system PG, the power demand amount can be decreased by decreasing the number of vehicles that execute the external charging, increasing the number of vehicles that execute the external power supply, decreasing a charging amount in the vehicle 50 that executes the external charging, or increasing a power supply amount in the vehicle 50 that executes the external power supply. The lower DR is executed when, for example, the power demand amount is larger than the power amount that can be supplied in the power system PG.

The server 700 is a computer belonging to the power company and configured to be communicable with the server 600 of the aggregator. The server 700 predicts the power supply and demand balance in the power system PG for each period (each time range) determined in advance, and outputs an adjustment requirement ARE of the power supply and demand balance to the server 600 according to a prediction result. The adjustment requirement ARE includes the prediction result regarding which is larger in a target period between the power demand amount and the power amount that can be supplied, and a power adjustment amount (hereinafter, referred to as an adjustment requirement power amount) RA that is required for adjusting the power demand amount in the power system PG during that period.

When the power demand amount is larger than the power amount that can be supplied, the adjustment requirement power amount RA indicates an amount of power that needs to be delivered (supplied) in the power system PG or an amount of power that needs to be reduced in the power system PG. On the other hand, when the power amount that can be supplied is larger than the power demand amount, the adjustment requirement power amount RA indicates an amount of power that needs to be consumed in the power system PG.

The server 600 belongs to the aggregator and is configured to manage the power resource group 400. The aggregator is an electricity company that adjusts the power demand amount in the power system PG using the power resource group 400. When the aggregator successfully adjusts the power demand amount in the power system PG, it can obtain a reward from the power company. On the other hand, when the aggregator fails to adjust the power demand amount in the power system PG (for example, fails to deliver, increase, or decrease the adjustment requirement power amount RA), it may be penalized by the power company.

The server 600 includes a processing device 605, a storage device 620, and a communication device 630. The processing device 605 includes a processor, such as a central processing unit (CPU), and a memory, such as a read-only memory (ROM) and a random access memory (RAM). The storage device 620 stores, for example, a program executed by the processing device 605 and various pieces of information and data used by the processing device 605. The communication device 630 may be, for example, various communication interfaces, and is configured to be able to send a DR signal (described below) to each of a plurality of vehicles 50 of the vehicle group 500.

Upon receiving the adjustment requirement ARE from the server 700, the server 600 sends a DR signal S1 to the vehicle 50, which is requested to participate in the DR by the aggregator, in the vehicle group 500.

The DR signal S1 is a signal for requesting the vehicle 50 to participate in the DR. The DR signal S1 includes a type of the DR (for example, whether it is the upper DR or the lower DR) and a time range (a request time range) in which the vehicle 50 is requested to participate in the DR.

The DR signal S1 further includes information indicating a DR amount (hereinafter, also referred to as a DR request amount), which is an amount of power that the aggregator requests each power resource (for example, the vehicle 50) to supply to the power system PG, or consume or save in the power system PG. For example, when the vehicle 50 participates in the DR by consuming (for example, the external charging) power of the power system PG using the power equipment, the DR amount indicates a transmitted power amount that the power equipment transmits to the vehicle 50. On the other hand, when the vehicle 50 participates in the DR by supplying (for example, the external power supply) power to the power system PG through the power equipment, the DR amount indicates a received power amount received by the power equipment from the vehicle 50. By realizing the transmitted power amount or the received power amount in the power resource group 400, the adjustment requirement power amount RA can be realized.

The server 600 is configured to receive an approval signal S11 from the vehicle 50. The approval signal S1 is sent from the vehicle 50 to the server 600 when the user of the vehicle 50 approves the participation in the DR by the vehicle 50.

When the server 600 receives the approval signal S11, a contract is established between the user of vehicle 50 and the aggregator. This contract includes information indicating the DR period, the DR type, and the DR amount. Contract information indicating the content of the contract is included in the approval signal S11 and stored in a storage device of the vehicle 50 and the storage device 620 of the server 600.

The vehicle 50 included in the power resource group 400 can obtain the reward from the aggregator by receiving a DR participation request from the server 600, which is an aggregator, by participating in the DR, and by executing the power transfer in response to the request from the server 600. On the other hand, when the vehicle 50 cannot participate in the DR or execute the power transfer in response to the request from the server 600, it may not be able to obtain the reward from the aggregator or may be penalized.

Figure 2:
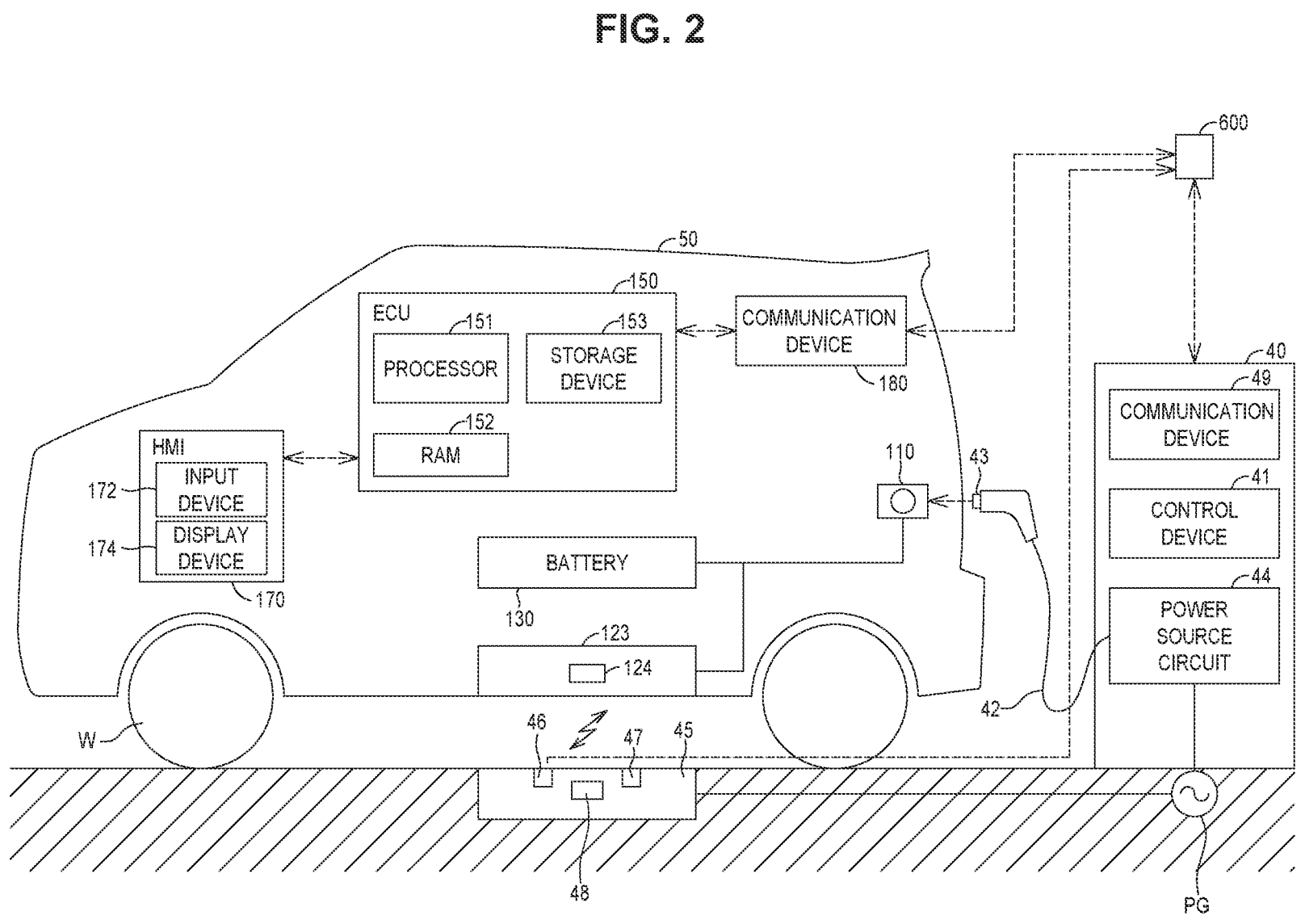

FIG. 2 is a diagram illustrating a configuration of the vehicle 50. With reference to FIG. 2, the vehicle 50 includes an inlet 110, a power transmission/reception device 123, a battery 130, an electronic control unit (ECU) 150, a human machine interface (HMI) device 170, and a communication device 180.

The inlet 110 is configured to receive power from a power stand 40 outside the vehicle 50. The power transmission/reception device 123 includes a coil 124. The power transmission/reception device 123 can receive power from power transmission/reception equipment 45 outside the vehicle 50 through the coil 124 in a non-contact manner or transmit power to the power transmission/reception equipment 45 in a non-contact manner. The inlet 110 and the power transmission/reception device 123 compose a "power transfer device".

The battery 130 may be a secondary battery, such as a nickel-metal hydride battery or a lithium-ion battery having a liquid or solid electrolyte.

The HMI device 170 includes an input device 172 and a display device 174. The input device 172 receives user operations (for example, an operation for inputting a time range in which the vehicle 50 can participate in the DR, a mode of the power transfer that the vehicle 50 can execute in that time range, and a destination of the vehicle 50). The display device 174 displays various screens.

The communication device 180 is configured to wirelessly communicate with various devices (for example, the server 600 or a user terminal (not shown)). For example, the communication device 180 receives the DR signal S1 (see FIG. 1) from the server 600 or sends the approval signal S11 to the server 600. Further, for example, the communication device 180 sends information determined in advance, such as a traveling plan of the vehicle 50, to the user terminal.

The ECU 150 controls various devices, such as the power transmission/reception device 123, the HMI device 170, and the communication device 180. For example, the ECU 150 controls the power transfer, such as the external charging or the external power supply of the vehicle 50, by outputting a requirement for starting the power transfer or a requirement for stopping power transfer to the power stand 40 or the power transmission/reception equipment 45. When the destination of the vehicle 50 is set, the ECU 150 can also set a traveling route of the vehicle 50 according to a current location and the destination.

The power transmission/reception equipment 45 may be installed, for example, under the ground of a parking space or a vehicle lane. The power transmission/reception equipment 45 includes a communication device 46, a control device 47, and a coil 48. The coil 48 is connected to the power system PG through an inverter (not shown). Using power supplied from the power system PG, the coil 48 is configured to supply power to the vehicle 50 in a non-contact manner (more specifically, to the coil 124 through an electromagnetic field) or receive power from the vehicle 50 in a non-contact manner.

The control device 47 controls the power transfer between the power transmission/reception equipment 45 and the vehicle 50 during a DR request period. The communication device 46 is configured to communicate with external devices, such as the server 600 or a user terminal. The communication device 46 is controlled by the control device 47.

The power stand 40 includes a control device 41, a power cable 42, a connector 43, a power source circuit 44, and a communication device 49.

The power cable 42 supplies power from the power stand 40 to the vehicle 50. The power cable 42 may also supply power from the vehicle 50 to the power stand 40.

The connector 43 is provided at a tip of the power cable 42 and configured to be insertable into the inlet 110 of the vehicle 50.

For example, the power source circuit 44 converts the power supplied from the power system PG and outputs the converted power to the power cable 42, or converts the power from the power cable 42 and outputs the converted power to the power system PG.

The communication device 49 is configured to communicate with external devices, such as the server 600 or a user terminal.

The control device 41 controls the communication device 49 and the power source circuit 44. According to a power transfer plan sent from the server 600, the control device 41 is configured to enable power transmission processing for transmitting power from the power stand 40 to the vehicle 50 in the DR request time range. The external charging of the vehicle 50 is executed by the execution of the power transmission processing. Further, according to the power transfer plan, the control device 41 is also configured to enable power reception processing for receiving power by the power stand 40 from the vehicle 50 in the DR request time range. The external power supply of the vehicle 50 is executed by the execution of the power reception processing.

In the power management system 10 having such a configuration, the power transfer can be executed by a plurality of methods between the vehicle 50 and the power system PG. In other words, examples of the methods of the power transfer that can be executed between the vehicle 50 and the power system PG include a contact power transfer method (hereinafter, referred to as a first method), a non-contact power transfer method during stop of the vehicle (hereinafter, referred to as a second method), and a non-contact power transfer method during traveling (hereinafter, referred to as a third method).

Figure 3:
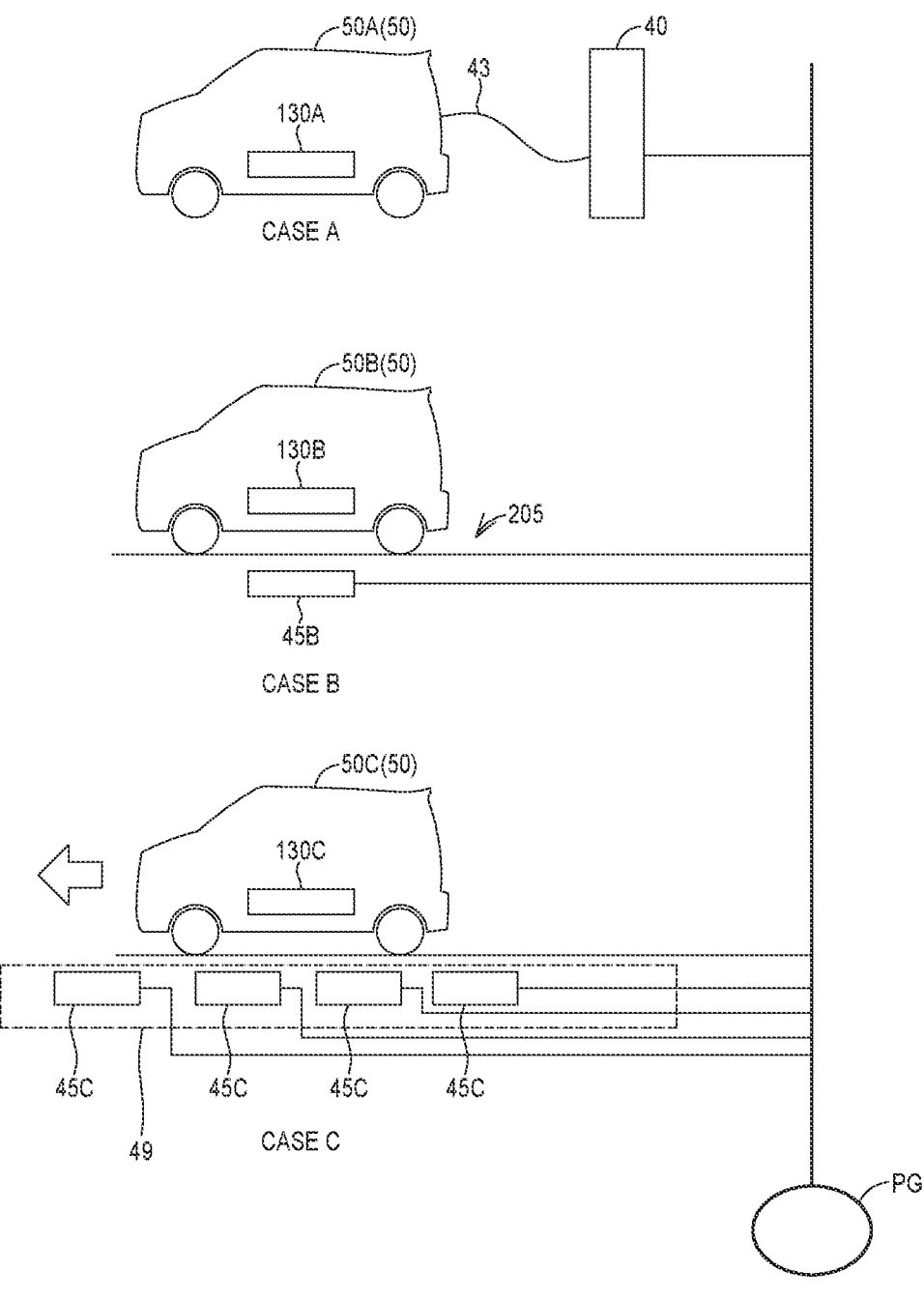
FIG. 3 is a diagram for describing a status when power transfer is executed using a first method, a second method, and a third method.

FIG. 3 is a diagram for describing a status when the power transfer is executed by the first method, the second method, and the third method.

The vehicle 50 of an upper part of FIG. 3 shows the vehicle 50 in a case of participating in the DR by executing the power transfer by the first method using the power stand 40 (a case A). It is assumed that the vehicle 50 in the case A is a vehicle 50A, and the battery 130 in the case A is a battery 130A.

As illustrated in the upper part of FIG. 3, the first method is a method of the power transfer between the vehicle 50A (the battery 130A) and the power stand 40 via the power cable 42.

The vehicle 50 of a middle part of FIG. 3 shows the vehicle 50 in a case of participating in the DR by executing the power transfer by the second method using the power transmission/reception equipment 45 installed under the ground of the parking space (a case B). It is assumed that the vehicle 50 in the case B is a vehicle 50B, the battery 130 in the case B is a battery 130B, and the power transmission/reception equipment 45 in the case B is power transmission/reception equipment 45B.

As illustrated in the middle part of FIG. 3, the second method is a method of the power transfer in a non-contact manner between the vehicle 50B and the power transmission/reception equipment 45B installed under the ground of the parking space when the vehicle 50B is stopped in the parking space.

The vehicle 50 of a lower part of FIG. 3 shows the vehicle 50 in a case of participating in the DR by executing the power transfer by the third method using a plurality of pieces of power transmission/reception equipment 45 installed under the ground of the vehicle line (a case C). It is assumed that the vehicle 50 in the case C is a vehicle 50C, the battery 130 in the case C is a battery 130C, and the pieces of power transmission/reception equipment 45 in the case C are pieces of power transmission/reception equipment 45C. In the description hereinbelow, a section in which the pieces of power transmission/reception equipment 45 are installed under the ground of the vehicle lane is referred to as a power supply lane.

As illustrated in the lower part of FIG. 3, the third method is a method of the power transfer in a non-contact manner between the vehicle 50C and each of the pieces of power transmission/reception equipment 45C installed under the ground of the vehicle line when the vehicle 50C is traveling on the power supply lane. During the traveling of the vehicle 50C, the power transfer is executed in a non-contact manner between the power transmission/reception equipment 45C that is positioned while facing the power transmission/reception device 123.

When the vehicle 50 as described above participates in the DR, it is necessary to select an appropriate method of the power transfer from among the first method, the second method, and the third method in consideration of a vacancy of the power transfer facility, the traveling plan, or the like.

Therefore, in the present embodiment, when participating in the DR, it is assumed that the ECU 150 of the vehicle 50 selects the method in the preferential order of the first method, the second method, and the third method and executes the power transfer.

In a comparison of power transfer efficiencies in the cases A to C in FIG. 3, the case A has the highest power transfer efficiency and the case C has the lowest power transfer efficiency. This is because, among the cases A to C, the case C has a higher power loss than the other cases, and the case A has a smaller power loss than the other cases. As a result, the case B has a lower power transfer efficiency than the power transfer efficiency in the case A and a higher power transfer efficiency than the power transfer efficiency in the case C.

For this reason, by preferentially selecting the power transfer of the first method having a relatively high efficiency in response to the DR request, it is possible to maximize a compensation obtained by responding to the DR request. Further, even when the power transfer of the first method cannot be executed, by preferentially selecting the second method over the third method having a relatively low transfer efficiency, it is possible to increase the compensation obtained by responding to the DR request by a larger amount than when selecting the third method. Further, even when none of the first method or the second method can be executed, by selecting the third method and responding to the DR request, it is possible to avoid being penalized for not participating in the DR.

Hereinbelow, with reference to FIG. 4, processing executed by each of the vehicle 50 (specifically, the ECU 150) and the server 600, which is the aggregator, will be described. FIG. 4 is a flowchart illustrating an example of the processing executed by each of the ECU 150 and the server 600. A left side of FIG. 4 illustrates a flowchart showing the processing executed by the ECU 150. FIG. 4 illustrates an example of processing when a discharging request is received from the server 600 as the DR request.

In step (hereinafter, step is referred to as S) 100, the ECU 150 determines whether the DR signal S1 including the discharging request is received. When the ECU 150 receives the DR signal S1 from the server 600 and the received DR signal S1 includes information indicating the discharging request, the ECU 150 determines that it has received the DR signal S1 including the discharging request. When the ECU 150 determines that it has received the DR signal S1 (YES in S100), the process proceeds to S102.

In S102, the ECU 150 acquires reservation information of the power supply facility for the DR request time range. The ECU 150 acquires the DR request time range included in the received DR signal S1, and acquires the reservation information of the power supply facility in the acquired request time range. The reservation information includes information (reservation vacancy information) of a time range in which use of the power supply facility is not reserved. As the power supply facility, a power supply facility capable of the power transfer of the first method (hereinafter, referred to as a contact power supply facility) and a power supply facility capable of the power transfer of the second method (hereinafter, referred to as a non-contact power supply facility) are included. For example, the ECU 150 may acquire the reservation information of the power supply facility from the server 600, may acquire the reservation information of the power supply facility from a management server, which is different from the server 600 and manages a reservation of the power supply facility, or may acquire the reservation information of the power supply facility from the user terminal. Further, the ECU 150 may acquire the reservation information of the contact power supply facility and the non-contact power supply facility closest to a current position, or may acquire the reservation information of the number (determined in advance) of contact power supply facilities and non-contact power supply facilities close to the current position. The ECU 150 acquires the current position using a position detection device (not shown), such as a Global Positioning System (GPS).

In S104, the ECU 150 determines whether there is a reservation vacancy in the contact power supply facility. The ECU 150 determines whether there is a reservation vacancy in the DR request time range, using the reservation vacancy information of the contact power supply facility in the reservation information of the power supply facility. For example, when the DR request time range is included in the time range in which there is a reservation vacancy, the ECU 150 determines that there is a reservation vacancy in the DR request time range. When the ECU 150 determines that there is a reservation vacancy in the contact power supply facility (YES in S104), the process proceeds to S106.

In S106, the ECU 150 reserves the contact power supply facility. For example, the ECU 150 executes a reservation process for reserving use of the contact power supply facility in the request time range included in the DR signal S1. The reservation process is executed by, for example, sending information on the time range in which the use is reserved to a server that manages the reservation of the power supply facility. However, when a related technology is used, details thereof will not be described. The ECU 150 may reserve the use of the contact power supply facility by setting, for example, a time corresponding to a start of the request time range as a start time and a cycle as an end time. Alternatively, the ECU 150 may reserve the use of the power supply facility with a predetermined time before the start of the request time range as the start time. Alternatively, the ECU 150 may reserve the use of the power supply facility with a predetermined time after the cycle of the request time range as the end time. When there is a plurality of contact power supply facilities to be reserved, the ECU 150 may reserve the use of the contact power supply facility closest to the current position of the vehicle 50, or, when the destination is set, it may reserve the use of the contact power supply facility closest to the traveling route to the destination. Thereafter, the process proceeds to S114. On the other hand, when the ECU 150 determines that there is no reservation vacancies in the contact power supply facility (NO in S104), the process proceeds to S108.

In S108, the ECU 150 determines whether there is a reservation vacancy in the non-contact power supply facility. The ECU 150 determines whether there is a reservation vacancy in the DR request time range using the reservation vacancy information of the non-contact power supply facility in the reservation information of the power supply facility. When the ECU 150 determines that there is a reservation vacancy in the non-contact power supply facility (YES in S108), the process proceeds to S110.

In S110, the ECU 150 reserves the non-contact power supply facility. Since a reservation method and the like are the same as those of the contact power supply facility, detailed description thereof will not be repeated. Thereafter, the process proceeds to S114. On the other hand, when the ECU 150 determines that there is no reservation vacancies in the non-contact power supply facility (NO in S108), the process proceeds to S112.

In S112, the ECU 150 acquires an installation position of the power supply lane. For example, the ECU 150 may acquire the installation position of the power supply lane by reading the position information of the power supply lane stored in a storage device 153 of the ECU 150 or a navigation system (not shown). Alternatively, the ECU 150 may acquire the installation position of the power supply lane by receiving the position information of the power supply lane from the server 600 or a server (not shown) different from the server 600. The ECU 150 may acquire the installation position of the power supply lane closest to the current position of the vehicle, or may acquire the installation positions of the number (that is determined in advance, such as three) of power supply lanes close to the current position of the vehicle. Thereafter, the process proceeds to S114.

In S114, the ECU 150 sets the traveling plan. For example, the ECU 150 may set a departure time in consideration of a distance from the current position to the reserved power supply facility, the average moving speed, or the like. Alternatively, when the vehicle is parked at a place in which the charging is possible (for example, at home or at a charging facility) different from the power supply facility, the ECU 150 may set a time range for charging to secure a power supply amount in the DR request time range. Further, when the destination is set after the request time range, the ECU 150 may set a time in a time range for charging by the sum of a power supply amount in the DR request time range and a power amount required to move to the destination. Alternatively, when the power supply facility is not reserved, the ECU 150 may set the traveling route such that the vehicle passes through the power supply lane of which the installation position is acquired in the DR request time range, and set the departure time for reaching the power supply lane in the DR request time range. The ECU 150 may send information on the set traveling plan to the user terminal. Further, the ECU 150 may send the approval signal S11 to the server 600 after setting the traveling plan. On the other hand, when the ECU 150 determines that it has not received the DR signal S1 including the discharging request (NO in S100), the process ends.

Next, processing executed by the server 600 will be described using a flowchart on the right side of FIG. 4.

In S200, the server 600 determines whether the DR request is needed. For example, upon receiving the adjustment requirement ARE from the server 700, the server 600 may determine that the DR request is needed. Alternatively, when the magnitude of an adjustment requirement power amount RA included in the adjustment requirement ARE is higher than a threshold value, the server 600 may determine that the DR request is needed. When the ECU 150 determines that the DR is needed (YES in S200), the process proceeds to S202.

In S202, the server 600 allocates a DR request amount to the power resource group 400 in order to realize the adjustment requirement power amount RA. The server 600 sets the DR request amount for each of a plurality of vehicles that can participate in the DR in the power resource group 400, and sets the DR request amount for a plurality of stationary power accumulation devices that can participate in DR in the power resource group 400.

In S204, the server 600 sends the DR signal S1 including information on the set DR request amount to each resource of the power resource group 400. For example, when the set DR request amount is a value corresponding to a discharging request, the server 600 sends the DR signal S1 including the discharging request to each resource of the power resource group 400. On the other hand, when the ECU 150 determines that the DR request is not required (NO in S200), the process ends.

An operation of the ECU 150 based on the structure and the flowchart as described above will be described.

For example, when the server 600 receives the adjustment requirement ARE from the server 700 or the like and the ECU 150 determines that the DR request is needed (YES in S200), the server 600 allocates the DR request amount to each power accumulation device of the power resource group 400 in order to realize the adjustment requirement power amount RA included in the adjustment requirement ARE (S202). Then, the server 600 sends the DR signal S1 to a control device that controls charging and discharging of each power accumulation device of the power resource group 400 (S204).

Upon receiving the DR signal S1 including the discharging request (YES in S100), the vehicle 50 acquires a reservation status of the power supply facility in the DR request time range (S102).

When There is Reservation Vacancy in Contact Power Supply Facility

When the ECU 150 determines that there is a reservation vacancy in the contact power supply facility from the acquired reservation information (YES in S104), the use of the parking space in which the power transfer by the first method is possible is reserved in the contact power supply facility in the DR request time range (S106). Then, a traveling plan including a schedule by which the power supply (the power transmission) will be executed in the contact power supply facility in the DR request time range is set (S114).

For example, when the vehicle 50 is connected to a charging cable at home, the departure time for arriving at the contact power supply facility by the start time of the DR request time range is set, and the charging of the battery 130 is reserved such that the DR request amount can be transmitted in the DR request time range. By sending the set traveling plan to the user terminal, the information on the traveling plan of the vehicle 50 can be shared with the user. The user moves the vehicle 50 to a reserved parking space of the contact power supply facility at the set departure time, and connects the power cable 42 to the inlet 110 after the arrival. When the DR request time range arrives, the ECU 150 starts the power transmission from the battery 130 to the power stand 40 via the power cable 42 according to the DR request amount. The power transmitted to the power stand 40 is supplied to the power system PG. The adjustment requirement power amount RA is realized by the power supply of the set DR request amount from each power accumulation device from the power resource group 400.

When there is No Reservation Vacancies in Contact Power Supply Facility and there is Reservation Vacancy in Non-Contact Power Supply Facility Upon determining that there is no reservation vacancies in the contact power supply facility in the DR request time range (NO in S104), the ECU 150 determines whether there is a reservation vacancy in the non-contact power supply facility from the acquired reservation information (S108). When the ECU 150 determines that there is a reservation vacancy in the non-contact power supply facility (YES in S108), the use of the parking space in which the power transfer by the second method is possible is reserved in the non-contact power supply facility in the DR request time range (S110). Then, a traveling plan including a schedule by which the power supply (the power transmission) will be executed in the non-contact power supply facility in the DR request time range is set (S114).

For example, when the vehicle 50 is connected to a charging cable at home, the departure time for arriving at the non-contact power supply facility by the start time of the DR request time range is set, and the charging of the battery 130 is reserved such that the DR request amount can be transmitted in the DR request time range. By sending the set traveling plan to the user terminal, the information on the traveling plan of the vehicle 50 can be shared with the user. The user moves the vehicle 50 to a reserved parking space of the non-contact power supply facility at the set departure time. Since the power transmission/reception equipment 45 is installed under the ground in the parking space, the power transmission from the battery 130 to the power transmission/reception equipment 45 via the power transmission/reception device 123 is started according to the DR request amount when the DR request time range arrives. The power transmitted to the power transmission/reception equipment 45 is supplied to the power system PG. The adjustment requirement power amount RA is realized by the power supply of the set DR request amount from each power accumulation device from the power resource group 400.

When there is No Reservation Vacancies in Power Supply Facility

Upon determining that there is no reservation vacancies in the contact power supply facility in the DR request time range (NO in S104) or the non-contact power supply facility (NO in S108), the ECU 150 acquires installation positions of one or more power supply lanes close to the current position of the vehicle 50 (S112). Then, a traveling route is set such that the vehicle passes through the acquired installation position of the power supply lane in the DR request time range, and the traveling plan is set by setting the departure time for reaching the power supply lane in the DR request time range (S114).

The information on the set traveling route and the information on the departure time are sent to the user terminal. The user causes the vehicle 50 to travel according to the received traveling route and departure time. Then, when the vehicle 50 passes through the power supply lane in the DR request time range, the power transmission is started from the battery 130 to the power transmission/reception equipment 45 facing a lower surface of the vehicle 50 from among the pieces of power transmission/reception equipment 45 via the power transmission/reception device 123. The power transmitted to the pieces of power transmission/reception equipment 45 is supplied to the power system PG. The adjustment requirement power amount RA is realized by the power supply of the DR request amount from each power accumulation device from the power resource group 400.

As described above, by the vehicle 50 according to the present embodiment, in response to the DR request, first, it is determined whether there is the reservation vacancy in the contact power supply facility and the contact power supply facility is reserved when there is a reservation vacancy. Therefore, the power transfer of the first method in the contact power supply facility is preferentially selected over the power transfer of the second method and the power transfer of the third method. Further, when there is no reservation vacancies in the contact power supply facility, whether there is a reservation vacancy in the non-contact power supply facility is determined and the non-contact power supply facility is reserved when there is a reservation vacancy. Therefore, the power transfer of the second method in the non-contact power supply facility is preferentially selected over the power transfer of the third method. In other words, by preferentially selecting the power transfer of the first method having a relatively high transfer efficiency (a small loss) in response to the DR request, it is possible to maximize a compensation obtained by responding to the DR request. Further, even when the power transfer of the first method is not executed, by preferentially selecting the second method over the third method having a relatively low transfer efficiency (a large loss), it is possible to increase a compensation obtained by responding to the DR request by a larger amount than when selecting the third method. Further, even when none of the first method or the second method can be executed, it is possible to respond to the DR request by selecting the third method and responding to the DR request. Therefore, it is possible to avoid being penalized for not participating in the DR. Therefore, it is possible to provide a vehicle participating in an adjustment of a power supply and demand balance and capable of selecting an appropriate method of the power transfer.

Further, by reserving the facility to be used in advance, it is possible to reliably participate in the DR by the selected method.

Modified Examples

In the above-described embodiment, it is described that the method is selected in the preferential order of the first method, the second method, and the third method in response to the request for the DR. However, for example, the method may be selected in the preferential order in response to the request for the DR immediately before (for example, a period from a predetermined time before the start time to the start time) the start time of the request time range. As such, a method having a relatively high efficiency for an urgent DR selection is preferentially selected, and thus it is possible to restrict the compensation obtained by responding to the DR request from being decreased.

Further, in the above-described embodiment, it is described that the power transfer is executed by any one of the first, the second, or the third method when the DR signal S1 is received. However, for example, when a loss amount caused by the penalty that is set for not participating in the DR request is smaller than a loss amount caused by selecting any one of the first method, the second method, or the third method, the ECU 150 may allow the vehicle 50 not to participate in the DR request.

For example, when it is determined that there are no reservation vacancies in the contact power supply facility or the non-contact power supply facility, a case is assumed in which the installation position of the power supply lane is acquired, and the traveling plan is set such that the vehicle 50 passes through the power supply lane in the DR request time range. At this time, when the loss amount caused by the penalty that is set for not participating in the DR request is smaller than the loss amount calculated in consideration of a power amount consumed by the vehicle 50 until it reaches the power supply lane, a power loss amount caused by the power supply while passing through the power supply lane, or the like, the ECU 150 may allow the vehicle 50 not to participate in the DR request.

As such, when the loss amount is caused by participating in the DR is large, it is possible to restrict an increase in the loss amount by not participating in the DR request.

Further, in the above-described embodiment, it is described that the contact power supply facility or the non-contact power supply facility is reserved when the DR signal S1 including the discharging request is received with reference to FIG. 4, and the traveling plan is set such that the vehicle passes through the power supply lane when the power supply facility cannot be reserved. However, for example, the contact power supply facility or the non-contact power supply facility may be reserved when the DR signal S1 including the charging request is received, and the traveling plan may be set such that the vehicle passes through the charging lane that can execute the charging using the non-contact power transfer during the traveling when the power supply facility cannot be reserved. An operation of the ECU 150 when the DR signal S1 including the charging request is received is the same as the operation of the ECU 150 when the DR signal S1 including the discharging request is received. For this reason, detailed description thereof will not be repeated.

Further, in the above-described embodiment, it is described that the method is selected in a preferential order of the first method, the second method, and the third method in response to the request for the DR. However, the preferential order may be changed depending on a charging state of the power accumulation device.

For example, in a case where the vehicle 50 has a photovoltaic power generation device (not shown) mounted thereon when the DR request time range includes a period in which an amount of power generated by the photovoltaic power generation device is higher than a threshold value, at least one of the second method and the third method may be preferentially selected over the first method.

Figure 5:
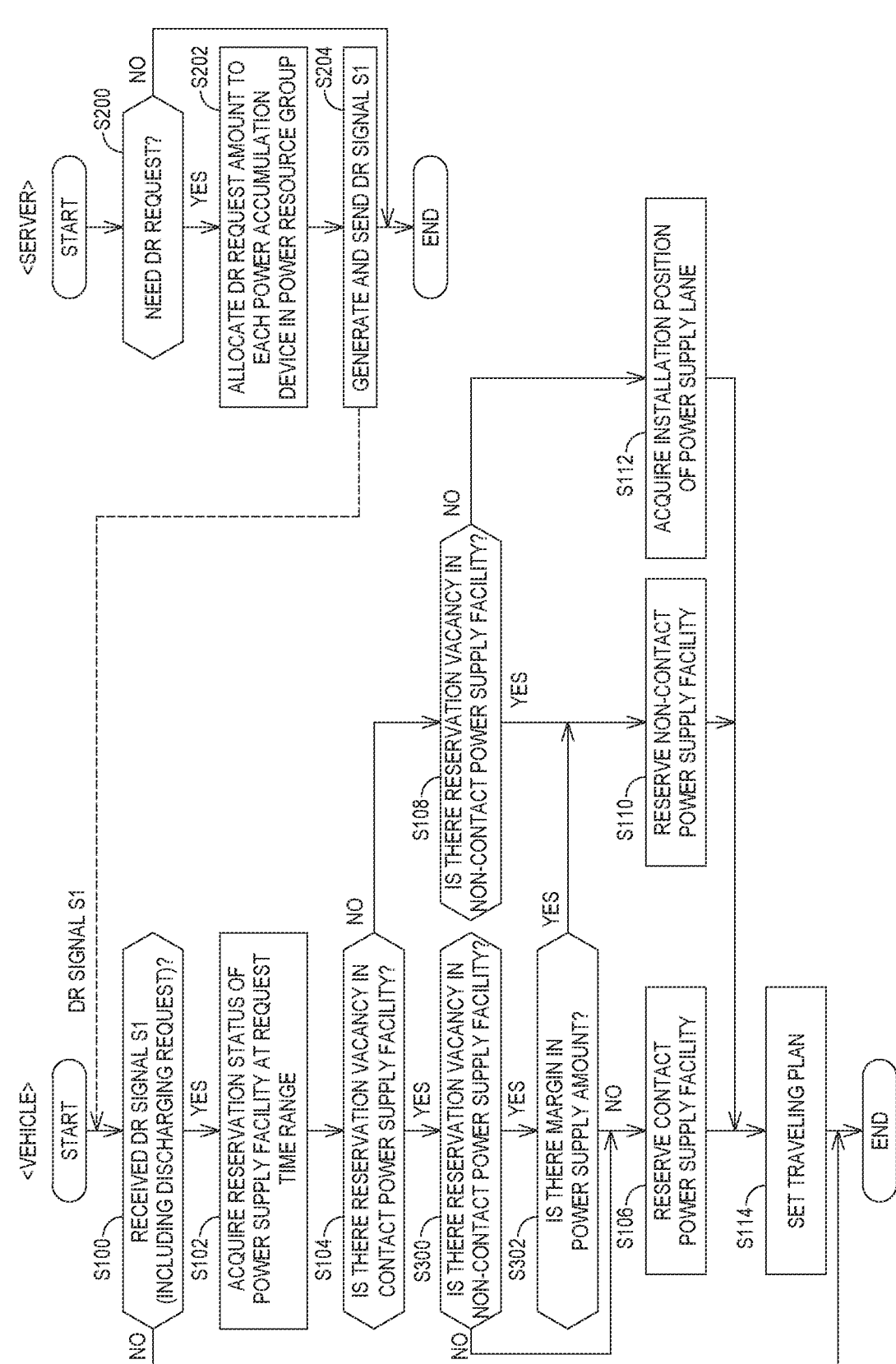
FIG. 5 is a flowchart illustrating an example of processing executed in each of an ECU and a server.

Hereinbelow, processing executed by the ECU 150 in a modified example will be described with reference to FIG. 5. FIG. 5 is a flowchart illustrating an example of the processing executed by each of the ECU 150 and the server 600 in the modified example.

A flowchart showing an example of the processing executed by the server 600 illustrated on a right side of FIG. 5 is the same as that showing the example of the processing executed by the server 600 illustrated on the right side of

15

FIG. 4. For this reason, detailed description of the processing executed by the server 600 will not be repeated.

Further, a flowchart showing an example of the processing executed by the ECU 150 illustrated on a left side of FIG. 5 includes the same processing as that showing the example of the processing executed by the ECU 150 illustrated on the left side of FIG. 4, and thus the same step numbers will be given. For this reason, the processing content is also the same except for cases described below, and thus detailed description thereof will not be repeated.

When it is determined that there is a reservation vacancy in the contact power supply facility (YES in S104), the process proceeds to S300.

In S300, the ECU 150 determines whether there is a reservation vacancy in the non-contact power supply facility. Since the determination method is as described above, detailed description thereof will not be repeated. When it is determined that there is a reservation vacancy in the non-contact power supply facility (YES in S300), the process proceeds to S302.

In S302, the ECU 150 determines whether there is a margin in the power supply amount. Specifically, for example, when the DR request time range includes a period in which the amount of power generated by the photovoltaic power generation device is higher than the threshold value, the ECU 150 determines that there is a margin in the power supply amount. The threshold value may be set by, for example, subtracting, from the DR request amount, a power amount that can be supplied (for example, a power amount that can be discharged until a State Of Charge (SOC) reaches a lower limit) of the battery 130 and a power amount consumed when traveling on a traveling route that passes through the power supply lane. When it is determined that there is a margin in the power supply amount (YES in S302), the process proceeds to S110. On the other hand, when it is determined that there is no margin in the power supply amount (NO in S302), the process proceeds to S106.

When it is determined that there is a reservation vacancy in the contact power supply facility (YES in S104) and it is determined that there is no reservation vacancies in the non-contact power supply facility (NO in S300), the process proceeds to S106.

As such, for example, when the contact power supply facility and the non-contact power supply facility are usable and there is a margin in the power supply amount, the use of the non-contact power supply facility is reserved. Therefore, it is possible to increase the number of DR participation frames for vehicles that can execute the power transfer using only the first method.

In the modified example, a case where, when it is determined that there is a margin in the power supply amount (YES in S302), the process proceeds to S110, and the non-contact power supply facility is reserved has been described. However, for example, the process may proceed to S112 and the traveling plan may be set such that the vehicle passes through the power supply lane.

A part or the whole of the above-described modified example may be appropriately combined and executed. The embodiments disclosed in the present disclosure should be considered as illustrative in all points, and not be considered as limited. The scope of the present disclosure is shown not by the above description of the embodiments but by the claims, and is intended to include meanings equivalent to the claims and all modifications within the scope thereof.

16

What is claimed is:

1. A vehicle configured to participate in demand response used for adjusting a power supply and demand balance in a power system, the vehicle comprising:
   a power accumulation device;
   a communication device configured to communicate with a server, the communication device being configured to transmit an approval signal including contract information from the vehicle to the server when the participation in demand response is approved and store the contract information in the server;
   a power transfer device configured to perform power transfer in a first method, a second method, and a third method; and
   a control device configured to control the power transfer device, wherein
   the first method is a method that enables power to be transferred through a power cable between the power accumulation device and an outside of the vehicle,
   the second method is a method that enables power to be transferred in a non-contact manner between the power accumulation device and the outside of the vehicle while the vehicle is stopped,
   the third method is a method that enables power to be transferred in the non-contact manner between the power accumulation device and the outside of the vehicle while the vehicle is traveling, and
   the control device is configured to, when the vehicle participates in the demand response, select a method in a preferential order of the first method, the second method, and the third method and execute the power transfer.

2. The vehicle according to claim 1, further comprising an acquisition device configured to acquire a reservation status of a facility that corresponds to a request area of the demand response and a request time range of the demand response, the facility being able to execute the power transfer with the vehicle being parked, wherein
   the control device is configured to preferentially select a facility that is able to execute the first method over the second method when a facility is reserved in the request area in the request time range by using the acquired reservation status.

3. The vehicle according to claim 1, wherein the control device is configured to select a method that is enabled to be executed in the preferential order of the first method, the second method, and the third method in response to a request for the demand response immediately before a start time.

4. The vehicle according to claim 1, wherein the vehicle is configured not to participate in the demand response when a loss amount caused by a penalty that is set for not participating in the demand response is smaller than a loss amount caused by selecting one of the first method, the second method, and the third method.

5. The vehicle according to claim 1, further comprising a photovoltaic power generation device, wherein
   the control device is configured to preferentially select at least one of the second method and the third method over the first method when a request time range of the demand response includes a period where an amount of power generated by the photovoltaic power generation device is higher than a threshold value.

* * * * *